(No Model.)
A. EASTHOPE.
VELOCIPEDE.
No. 404,693. Patented June 4, 1889.
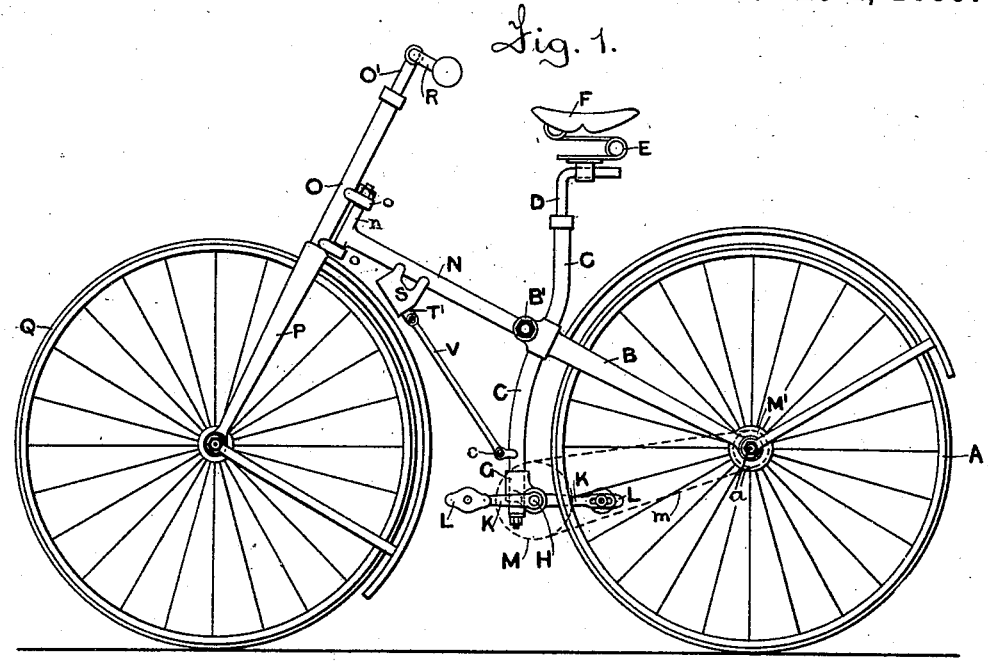
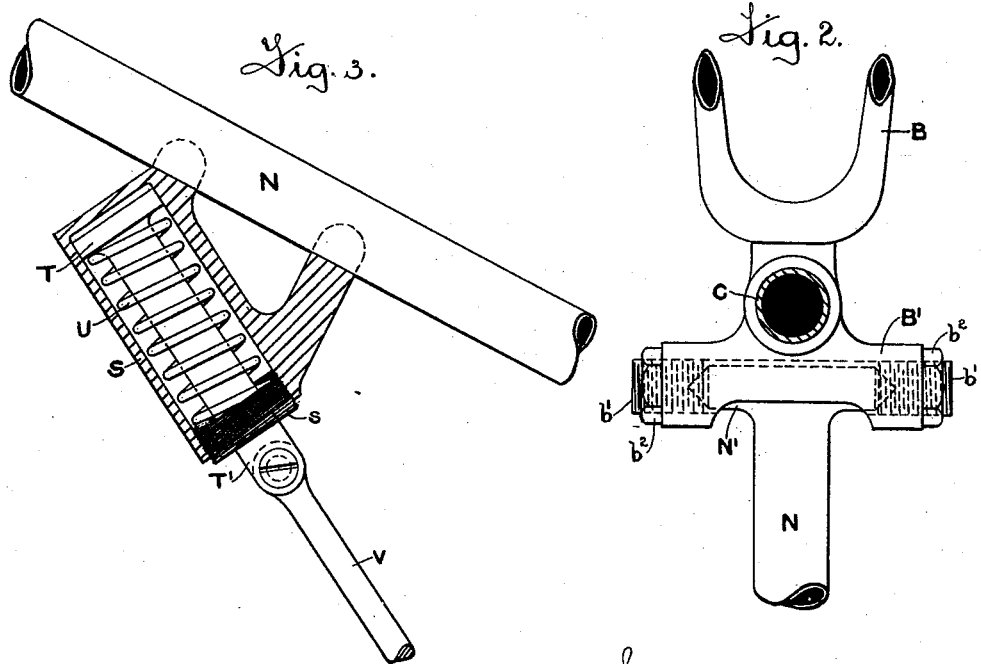
Witnesses:
Edward C. Hammond.
Ernest W. Batten.
Inventor:
Alfred Easthope.
By his Attorney
Robt. Ed. Phillips

UNITED STATES PATENT OFFICE.

ALFRED EASTHOPE, OF WOLVERHAMPTON, COUNTY OF STAFFORD, ENGLAND, ASSIGNOR TO ALBERT H. OVERMAN, OF BOSTON, MASSACHUSETTS.

VELOCIPEDE.

SPECIFICATION forming part of Letters Patent No. 404,693, dated June 4, 1889.

Application filed March 8, 1887. Renewed June 7, 1888. Serial No. 276,305. (No model.)

*To all whom it may concern:*

Be it known that I, ALFRED EASTHOPE, a subject of the Queen of Great Britain, residing in Wolverhampton, in the county of Stafford, England, have invented certain new and useful Improvements in Velocipedes, of which the following is a specification.

My invention relates to the construction of the frames of those velocipedes having rear driving and front steering wheels, and in which the steering wheel or wheels is or are controlled by a transverse handle-bar; and it has for its object the suppression of vibration by allowing the frame to give slightly in a vertical direction immediately under the seat of the rider. I attain this object by mechanism illustrated in the accompanying drawings, in which—

Figure 1 is a side elevation of a rear-driving front-steering safety-bicycle, showing the application of my invention to this type of machine. Fig. 2 is a view, on an enlarged scale, showing the horizontal hinge or joint in the frame carrying the driving-wheel; and Fig. 3 is a view, on an enlarged scale, showing the spring mechanism for controlling the action of the horizontal hinge or joint.

Similar parts are marked with like letters of reference throughout the several views.

The driving-wheel A is mounted on an axle $a$, carried in a fork B of the usual type, and near to the top of the fork is fixed a tube C, which runs upward vertically, or approximately so, to carry the seat-support D, on which is mounted a spring E and saddle F, of any suitable or convenient type, and downward to carry a suitable bracket G, in bearings attached to which the pedal crank-axle H is mounted, and is provided with the usual cranks K K, pedals L L, and chain-wheel M, by which motion is communicated through the chain $m$ to the chain-wheel M', fixed to the driving-wheel A if the wheel is mounted loosely on the axle $a$, or to the axle itself if the driving-wheel is fixed thereto. As near to the junction of the fork B and tube C as possible is hinged or jointed the backbone N, which runs forward and terminates in a neck-spindle $n$, having the usual centers by which it is pivoted to suitable projections $o$ $o$ on the tubular steering-post O of the fork P, carrying the steering-wheel Q, so that the steering-wheel is capable of being turned on an approximately vertical axis for the purpose of guiding the machine, a suitable handle-bar R being fixed to the top of the steering-post O, or to an adjustable stalk O', fitting therein. The hinge or joint by which the backbone N is connected to the part of the frame carrying the driving-wheel A, pedal crank-axle H, and seat F may be made in any suitable manner; but I prefer to use the particular one illustrated by the accompanying drawings, which consists of a transverse tubular socket B', formed on or fixed to the frame carrying the driving-wheel, pedal crank-axle, and seat, having female set-screws $b'$ $b'$ tapped into each end of it and locked by suitable lock-nuts $b^2$ $b^2$. These set-screws engage with male centers formed on the end of a transverse spindle N', formed on or fixed to the backbone N, the front of the socket B' being cut away to admit of the backbone moving through a given arc, so that the two parts of the frame connected by the hinge or joint may give in a downward direction so far as the elastic connection controlling them will allow, but not in an upward direction past their normal position of rest, so that the machine will not double up when lifted from the ground. If any hinge or joint other than that hereinbefore described is used, a suitable stop to effect this purpose is provided.

To control the action of the hinge or joint, the backbone N is connected with the part of the frame carrying the driving-wheel A, the pedal crank-axle H, and the seat F by an elastic tie-rod or other suitable connection. This connection may be made between any suitable points of the respective parts of the frame of the machine, with the controlling-spring either in tension or compression. If the spring is in compression, the arrangement shown by the drawings is most convenient. In the backbone N is fixed a cylinder S, in which fits a piston T, bearing against a helical spring U. Connected with the piston T is a piston-rod T', which passes through the end cover $s$ of the cylinder, and is connected to a rod V, which is fixed to the lower end of the tube C by a suitable connection $c$. The cover $s$ is screwed into the cylinder, so as to provide a ready means of adjusting the elasticity of the spring U to adjust the flexibility of the frame to the varying weights of riders or the unevenness of the road.

If desired, the elastic connection may be made between the top of the backbone N and the top of the tube C, in which case the spring U would be placed on the other side of the piston T, and the rod V, which would then be in compression, would be made stronger accordingly.

Instead of the elastic connection hereinbefore described, and shown by the accompanying drawings, a plain helical spring in tension may be used, the ends thereof being attached or connected to the two parts of the frame, as hereinbefore described.

It will be seen that this invention may be carried into practical effect on all velocipedes having rear driving and front steering wheels, in which the latter is or are controlled by a transverse handle-bar, and in which the connecting part of the frame between the driving and steering wheels is a single backbone, whether one or two driving or steering wheels are used, the vital points of my invention being the same, though the details of its construction may possibly require to be varied in a manner that will suggest itself to any one conversant with these machines.

By placing the hinge or joint as nearly as possible under the seat for the rider the movement of the rider, owing to the play of the hinge or joint, is kept as nearly as possible in a vertical plane, so that there is no tendency to throw the rider backward or forward.

I am aware that prior to my invention the frames of some velocipedes have been constructed in two or more parts hinged together and controlled by suitable springs, and also that auxiliary frames carrying the seat, pedal crank-axle, and other parts, either together or in combination, have been hinged or jointed to the main frame of machines and controlled by springs for the purpose of isolating the rider from the vibration set up by the passage of the machine over rough and uneven roads, and I therefore do not broadly claim this particular construction of frame; but What I do claim as my invention, and desire to secure by Letters Patent, is:—

1. In a rear-driving front-steering velocipede, the combination, with a steering-frame carrying one or more steering-wheels and having a transverse handle-bar connected with it, of a main frame having the said steering-frame movably connected with its forward end, carrying one or more driving-wheels, having a seat-support and a crank-shaft support and provided with a vertically-acting hinge, and an elastic connection joining parts of the main frame on opposite sides of the hinge, whereby the frame cushions vertically, substantially as set forth.

2. In a rear-driving front-steering velocipede, the combination, with a steering-frame carrying one or more steering-wheels and having a transverse handle-bar connected with it, of a main frame having the said steering-frame movably connected with its forward end, carrying one or more driving-wheels, having a seat-support and a crank-shaft support and provided with a vertically-acting hinge, and an elastic connection joining parts of the main frame on opposite sides of the hinge, whereby the frame cushions vertically, the said seat-support, crank-shaft support, and hinge being located in virtually the same vertical line, substantially as set forth.

3. In a velocipede, the combination, with a steering-frame carrying one or more steering-wheels and having a transverse handle-bar connected with it, of a main frame having the steering-frame movably connected with its forward end, carrying one or more driving-wheels and provided with a seat-support, a crank-shaft support, and with a vertically-acting hinge, and an elastic connection joining the forward part of the said main frame with the crank-shaft support which is on the opposite side of the hinge therefrom, substantially as set forth.

4. In a velocipede, the combination, with a steering-frame carrying one or more steering-wheels and having a transverse handle-bar connected with it, of a main frame having the said steering-frame movably connected with its forward end, carrying one or more driving-wheels and provided with an upright seat-support and a depending crank-shaft support, substantially as shown, and with a vertically-acting hinge, and an elastic connection joining parts of the frame on opposite sides of the said hinge, whereby the same has a cushioning action, substantially as set forth.

5. In a velocipede, the combination, with a main frame having a vertically-acting hinge, of a tie connecting parts of such frame on opposite sides of the said hinge, and consisting, essentially, of a rod, a spring located at one end thereof, and a box inclosing such spring, substantially as set forth.

In witness whereof I have hereunto signed my name in the presence of two subscribing witnesses.

ALFRED EASTHOPE.

Witnesses:
DON. BRAZIER,
EDWIN EASTHOPE.